United States Patent [19]

Gibson

[11] 4,395,096
[45] Jul. 26, 1983

[54] VARIABLE MAGNIFICATION TELESCOPIC SIGHT HAVING RETICLE CENTERING MOUNT

[75] Inventor: Dale E. Gibson, Salem, Oreg.

[73] Assignee: Leupold & Stevens, Inc., Beaverton, Oreg.

[21] Appl. No.: 311,001

[22] Filed: Oct. 13, 1981

[51] Int. Cl.³ .................... G02B 7/10; G02B 27/32; F41G 1/38

[52] U.S. Cl. ................... 350/560; 350/562; 33/245; 33/297

[58] Field of Search ............... 350/560–566, 350/576; 33/245, 297; 356/251

[56] References Cited

U.S. PATENT DOCUMENTS

| | | | |
|---|---|---|---|
| 2,858,732 | 11/1958 | Kollmorgen et al. | 350/566 |
| 3,161,716 | 12/1964 | Burris et al. | 350/560 |
| 3,297,389 | 1/1967 | Gibson | 350/562 |
| 3,386,330 | 6/1968 | Burris et al. | 350/560 |

*Primary Examiner*—Jon W. Henry
*Attorney, Agent, or Firm*—Klarquist, Sparkman, Campbell, Leigh, Whinston & Dellett

[57] ABSTRACT

A telescopic sight for a rifle or an optical instrument is described having an improved reticle centering mount apparatus. A reticle centering sleeve is provided around a reticle mounting ring mounted within an outer housing tube containing erector lenses supported within an inner lens holder tube in axial alignment along an optical axis. The reticle centering sleeve has a longitudinal cross-section of tapered shape which is wedged between the housing tube and the mounting ring to center the sight point of the reticle on the optical axis. When the erector lenses are longitudinally adjusted within the lens tube to change the magnification of the telescopic sight, the reticle sight point is maintained centered on the image transmitted through such telescopic sight by the centering sleeve. The reticle centering sleeve is made of synthetic plastic material such as nylon and includes a plurality of inward projections spaced around the circumference of the sleeve which are of uniform height and deform under compression to reduce the radial pressure applied to the reticle mounting ring which enables the reticle wires to be maintained in a taut condition.

20 Claims, 6 Drawing Figures

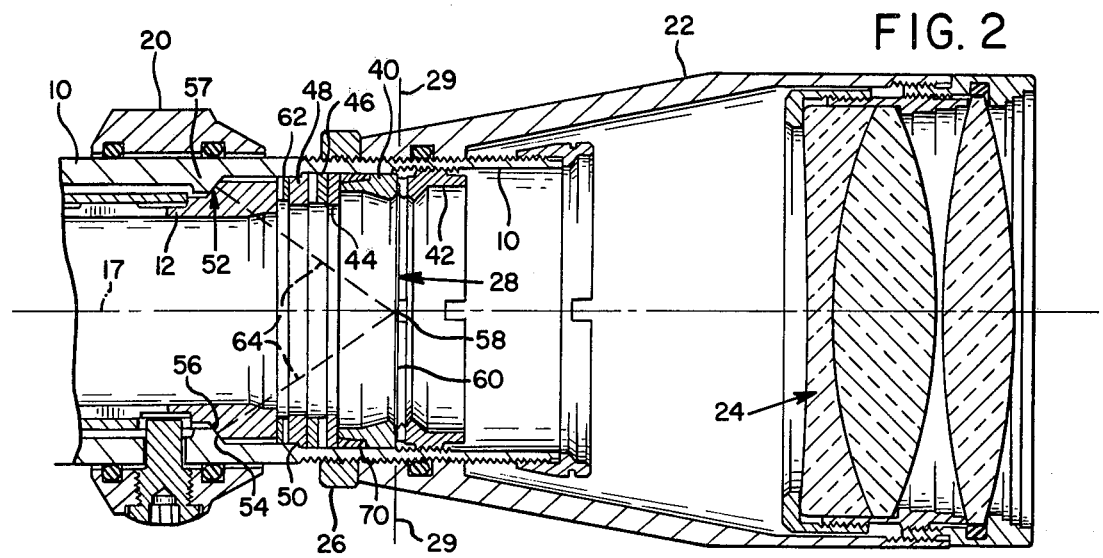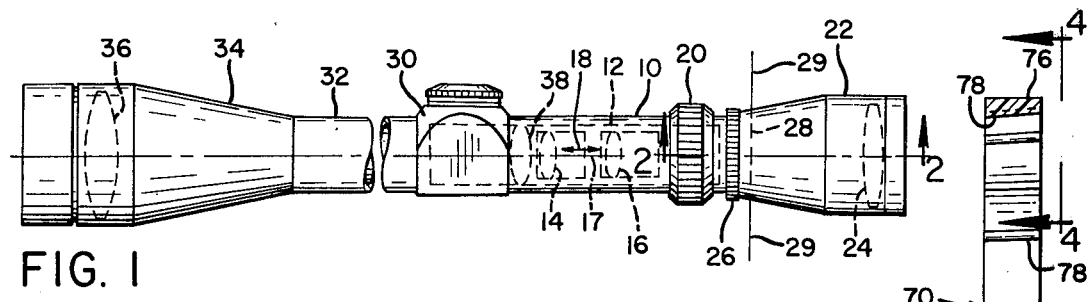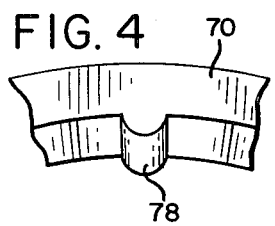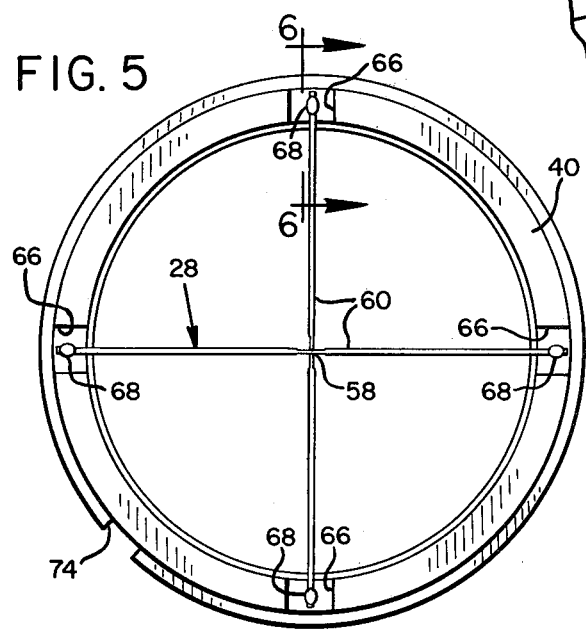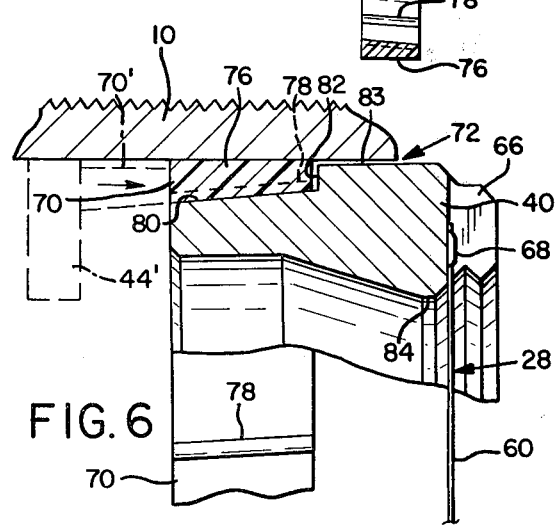

VARIABLE MAGNIFICATION TELESCOPIC SIGHT HAVING RETICLE CENTERING MOUNT

BACKGROUND OF INVENTION

The subject matter of the present invention relates generally to telescopic sights having reticle sight centering means, and in particular, to such telescopic sight having a reticle centering sleeve for maintaining the reticle sight point centered on the optical axis of the erector lenses even when such lenses are adjusted longitudinally to vary the magnification of the telescopic sight. The telescopic sight of the present invention may be used as a rifle scope or for an optical instrument, such as a surveying instrument.

It has previously been proposed in fixed magnification telescopic sights, such as that shown in U.S. Pat. No. 2,858,732 of Kollmorgen et al issued Nov. 4, 1958 and U.S. Pat. No. 3,297,389 of Gibson issued Jan. 10, 1967 to mount the reticle sight by threadedly attaching the reticle mounting ring within a lens holder tube or within a housing tube containing the lens holder tube. In the Kollmorgen patent, the reticle sight moves with the lens holder tube to make adjustments for changes in elevation and windage, while in the Gibson patent the reticle sight is fixed and separate from the lens holder tube so that it does not move with such tube. In both of these prior patents the reticle sight point formed by two crossing wires, may be mounted at a distance slightly displaced from the optical axis of the lens system due to tolerances in the diameter of the reticle mounting ring and housing tube or lens holder tube. However, since these rifle scopes are of a fixed magnification, this lack of centering of the reticle crossing point of the optical axis is not apparent because the image transmitted through the lens system does not move relative to such crossing point due to any change of magnification.

However, if such conventional reticle mounting apparatus is employed in a scope of variable magnification, such as U.S. Pat. No. 3,161,716 of Burris et al issued Dec. 15, 1964, a serious problem is created because when it is off-center from the optical axis the reticle sight point moves relative to the image transmitted through the lens system as the magnification of such image changes. This problem is discussed in the Burris patent and is sometimes referred to as "image drift" since the reticle sight point appears to drift across the image of the target transmitted through the lens system of the scope when the magnification of such lens system is changed. In Burris the reticle mounting ring is only held by longitudinal pressure of a lock ring in a centered position so that vibration and shock due to rifle recoil can loosen and move such mounting ring off-center.

The above-discussed image drift problem is solved by the reticle centering sleeve provided around the reticle mounting ring in the telescopic sight apparatus of the present invention. The reticle centering sleeve is of a tapered cross-section and is positioned around one end of the reticle mounting ring so that it is wedged between the housing tube and the reticle mounting ring to automatically center the sight point on the optical axis of the erector lenses. The reticle centering sleeve is provided with a plurality of inward projections spaced around the circumference of such sleeve, with each projection having a substantially uniform height. Since the reticle centering sleeve is made of synthetic plastic material, such as nylon, the inward projections deform under compression between the lens tube and the mounting ring. As a result, the reticle centering sleeve fills the entire space between the housing tube and the reticle mounting ring to compensate for different diameter tolerances and to prevent loosening of such ring due to vibration and shock. Thus, the centering sleeve centers the reticle sight point on the optical axis of the lenses and maintains such centered position under operating conditions in spite of repeated shock vibrations caused by rifle recoil. The reticle centering sleeve of the present invention provides an inexpensive solution to the image drift problem and, in addition, reduces the radial compression applied to the reticle mounting ring which tends to produce slack in the reticle wires thereby maintaining such reticle wires in a taut condition.

SUMMARY OF INVENTION

It is therefore one object of the present invention to provide a telescopic sight apparatus which automatically centers the reticle sight point on the optical axis of lenses employed in such apparatus.

Another object of the invention is to provide such a telescopic sight apparatus with an improved reticle centering means which is relatively inexpensive and which maintains the reticle sight point centered on the optical axis during normal operating conditions including shock and vibration.

A further object of the invention is to provide such a telescopic sight apparatus of variable magnification which eliminates image drift of the viewed image relative to the reticle sight point as the magnification of such image is changed.

An additional object of the invention is to provide such an improved telescopic sight apparatus in which the reticle sight is fixedly mounted in the eyepiece lens focal plane and the erector lens holder tube pivots about a socket having a radius of curvature whose center corresponds to the reticle sight point to maintain such sight point centered on the optical axis of the erector lenses in spite of lateral movement of such lens holder tube.

Still another object of the invention is to provide such a telescopic sight apparatus for a rifle which maintains the reticle sight point centered on the optical axis in spite of vibration and shock caused by rifle recoil during firing.

A still further object of the invention is to provide such an improved telescopic sight apparatus in which the reticle sight point is centered on the optical axis by a reticle centering sleeve which surrounds the reticle mounting ring and fills the space between such mounting ring and a surrounding tube.

A still additional object of the invention is to provide such an improved telescopic sight apparatus in which the reticle centering sleeve is made of synthetic plastic material and is provided with inward projections which are deformed by compression between the reticle mounting ring and the surrounding tube to reduce the radial compression applied to the mounting ring and to maintain the reticle wires in a taut condition.

DESCRIPTION OF DRAWINGS

Other objects and advantages of the present invention will be apparent from the following detailed description of a preferred embodiment thereof and from the attached drawings of which:

FIG. 1 is a side elevation view of a telescopic sight apparatus in accordance with the present invention;

FIG. 2 is an enlarged horizontal section view taken along the line 2—2 of a portion of the apparatus of FIG. 1;

FIG. 3 is an enlarged section view of the reticle centering sleeve employed in FIG. 2;

FIG. 4 is an enlarged partial elevation view taken along the line 4—4 of FIG. 3;

FIG. 5 is a rear elevational view of the reticle mounting ring and centering sleeve assembly employed in FIG. 2; and FIG. 6 is a vertical section view taken along the line 6—6 of FIG. 5.

DESCRIPTION OF PREFERRED EMBODIMENT

As shown in FIG. 1, one embodiment of the telescopic sight apparatus of the present invention includes a housing tube 10 containing image erector lenses which may be mounted in a lens holder tube 12 including a first erector lens 14 and a second erector lens 16 having their centers aligned along an optical axis 17. The longitudinal position of the erector lenses may be changed, as indicated by the double headed arrow 18, to vary the magnification of the telescopic sight apparatus. This may be accomplished by rotation of a power selector ring 20 mounted on the outside of the housing tube 10 in a conventional manner like that shown in U.S. Pat. No. 3,161,716 of Burris et al. The right end of the housing tube 10 is threadedly connected to an eyepiece housing 22 which contains an ocular or eyepiece lens system 24. The eyepiece housing 22 is held in fixed engagement with the tube 10 by means of a lock nut 26 threaded on such tube. A reticle sight 28 is mounted within the right end of the housing tube 10 in the focal plane 29 of the eyepiece lens system 24 in the manner hereafter described with reference to FIGS. 2 to 6.

The left end of the housing tube 10 is threadedly connected into a windage and elevation adjustment turret 30 containing two adjustment screws extending at right angles to each other into engagement with the left end of the lens holder tube 12 to pivot such lens holder tube in two mutually perpendicular directions about a socket or other pivot means at the right end thereof to compensate for changes in wind conditions and in distance from the target. The turret housing 30 is threadedly attached to the right end of a second housing tube 32 which is also threadedly attached at its left end to an objective housing 34 containing an objective lens system 36. In addition, the optical system of the telescopic sight may include a field lens 38 which is fixedly mounted within the left end of the lens holder tube 12 so such field lens is not adjusted longitudinally in the manner of the erector lenses.

As shown in FIG. 2, the reticle sight 28 is attached to a reticle mounting ring 40 which is held within the rear end of the housing tube 10 by means of a lock ring 42 which is threadedly connected to internal threads on such tube. The lock ring is threaded into engagement with the right end of the mounting ring 40. The left end of the reticle mounting ring 40 is engaged by a thrust washer 44 which in turn is resiliently engaged by a steel calibration adjustment spring 46 of the wave spring type. A stop ring 48 engages the left end of the adjustment spring 46 and is provided with an outer flange which engages an internal shoulder 50 on the inside of the housing tube 10 to prevent movement of such stop member to the left in such tube beyond shoulder 50. Thus, stop ring 48 and lock ring 42 form two stop members between which the reticle mounting ring 40, the thrust washer 44 and the adjustment spring 46 are clamped.

The lens holder tube 12 is pivoted at its right end about a half socket pivot means 52 including a spherical pivot surface 54 provided on an external shoulder of such lens holder tube. The spherical pivot surface 54 engages a conical socket surface 56 provided on an internal flange 57 projecting from the inside of the housing tube 10. The reticle sight means 28 is mounted so that its sight point 58 coincides with the center of the radius of curvature 64 of the spherical pivot surface 54, such sight point being preferably formed by the crossing point of two intersecting reticle wires 60 as shown in FIG. 5. The spherical pivot surface 54 is held in engagement with the conical socket surface 56 by a steel socket spring 62 of the wave spring type positioned between the right end of the lens holder tube 12 and the left end of the stop ring 48. As a result, when the lens holder tube 12 is pivoted by the windage and elevation adjustment screws in the turret housing 30, the optical axis 17 of the erector lenses 14 and 16 still passes through the sight point 58 of the reticle 28 to maintain such reticle in focus and centered on the received image transmitted through such erector lenses to the eyepiece lens.

As shown in FIGS. 5 and 6, the reticle sight 28 includes reticle wires 60 and the reticle mounting ring 40 which is provided with four notches 66 in the right end thereof, each having a flat bottom surface to which the ends of the reticle wires 60 are soldered at 68. A reticle centering sleeve 70 of synthetic plastic material is provided around the outer surface of the left end of the reticle mounting ring 40 so that such centering sleeve is compressed between the mounting ring 40 and the inner surface of the housing tube 10 which are both metal, such as brass and aluminum, respectively.

As shown in FIG. 6, the reticle centering sleeve is first inserted into the end of the housing tube 10 so that the sleeve is located at position 70' in engagement with the thrust washer 44'. Then the mounting ring is inserted into the tube until its left end is positioned partially within such centering sleeve. Next, the lock ring 42 is threaded into the housing tube 10 into engagement with the right end of the mounting ring 40. The locking ring is tightened pushing the mounting ring 40 into the centering sleeve until such mounting ring is in engagement with the thrust washer 44. This forces the centering sleeve completely onto the mounting ring into the position 70 shown in FIG. 6. In this position, the centering sleeve 70 completely fills the space between the outer surface of the housing tube 10 thereby centering the reticle sight point 58 within the housing tube 10 in alignment with the optical axis 17 of the erector lenses. As a result, a gap spacing 72 of uniform width is created around the right end of the mounting ring 40 between such mounting ring and the inner surface of the housing tube 10. Due to manufacturing tolerances there is always some spacing between such mounting ring 40 and such housing tube, which without the presence of the centering sleeve 70, would make it extremely difficult to maintain the sight point 58 in alignment with the optical axis 17. As shown in FIG. 5, a keyway 74 is provided in the outer surface of the reticle mounting ring 40 which engages a key projection on the inner surface of the housing tube 10 to prevent rotation of such mounting ring, and thereby properly orient the reticle wires 60.

As shown in FIGS. 3 and 4, the reticle centering sleeve 70 is an annular sleeve having a longitudinal cross-section 76 of a tapered shape which tapers from a minimum thickness at the right end thereof to a maximum thickness at the left end thereof over a length of 0.095 inch. The bottom edge of the cross-section 76 forms an angle of about 5 degrees with the top edge of such cross-section. In addition, a plurality of projections or rubs 78 are provided on the inner surface of the centering sleeve and are spaced substantially uniformly about the circumference of such sleeve. Preferably, twelve of such projections or ribs 78 spaced apart by 30 degrees are employed, each projection having a substantially uniform height of about 0.005 inch and being in the form of a semicircular cylinder as shown in FIG. 4. Thus, the tapered cross-section 76 has a minimum thickness of 0.015 inch between projections and 0.020 inch at such projections and a maximum thickness of 0.025 inch between projections and 0.030 inch at such projections. The bottom of the projections 78 are shown by dashed lines in FIGS. 3 and 6 to delineate them from the tapered cross-section 76 of the centering sleeve.

The left end of the mounting ring 40 is provided with a tapered outer surface 80 which extends downward from an external shoulder 82 at an angle of about 5 degrees with respect to the horizontal so that it substantially matches the taper of the cross-section 76 of the centering sleeve. The inner diameter of the centering sleeve 70 at the right end thereof with the projections at the minimum width portion of the longitudinal cross-section 76 is about 0.860 inch, while the outer diameter of the tapered surface 80 of the mounting ring 40 adjacent external shoulder 82 is 0.866 inches. This means that the reticle centering sleeve is stretched outwardly 0.006 inch in diameter as it is forced up the tapered portion 80 of the mounting ring into position 70 of FIG. 6 to hold such sleeve on such mounting ring. This stretching continues until the thrust washer 44 engages the left end of the mounting ring 40 so that the left end of the centering sleeve 70 is in radial alignment with the left end of such mounting ring. In this position the centering sleeve 70 extends above the outer surface 83 of the right end of the mounting ring 40 by an amount equal to or less than the height of the projections or ribs 78. Thus, in the example given above, the projections 78 have a height of 0.005 inch and the sleeve 70 extends 0.003 inch above surface 83. As a result, projections 78 are compressed and flattened by the pressure between the mounting ring 70 and the housing tube 10. The centering sleeve 70 is made of a deformable synthetic plastic material, preferably nylon, so that such projections 78 deform by such compression in order to reduce the amount of radial compression which is transmitted to the mounting ring 40 and tends to produce slack in the reticle wires 60. Thus, not only does the centering sleeve 70 automatically center the reticle sight point 58 on the optical axis 17 of the erector lenses, but it also maintains the reticle wires 60 in a taut condition. Furthermore, because the centering sleeve 70 fills the radial space 72 between the mounting ring 40 and the housing 10, it prevents loosening of the mounting ring due to vibration and shock such as rifle recoil.

The reticle mounting ring 40 has a minimum inner diameter diaphragm portion 84 which forms a first diaphragm opening for limiting the outer edge of the target and reticle images that are transmitted to the eyepiece lens system. A second diaphragm opening of the same diameter as the first diaphragm opening, is provided on the lock ring 42 to further limit the outer edge of the eyepiece image because it is spaced rearwardly of such first diaphragm. Therefore, the second diaphragm actually functions as the field stop of the optical system.

It will be obvious to those having ordinary skill in the art that many changes may be made in the above described detailed description of a preferred embodiment of the invention. Therefore, the scope of the present invention should only be determined by the following claims.

I claim:

1. Reticle mounting apparatus for a telescopic sight, comprising:
   a housing tube containing lenses supported in axial alignment along an optical axis;
   a reticle mounting ring secured within said tube;
   a reticle sight means attached to said mounting ring and providing a sight point; and
   a reticle centering sleeve provided around said mounting ring, said sleeve having a longitudinal cross-section of tapered shape which is wedged between said tube and said mounting ring to center the sight point on said optical axis.

2. Reticle mounting apparatus in accordance with claim 1 in which the lenses are erector lenses mounted in a lens holder tube within the housing tube and includes means for adjusting the longitudinal position of the lenses in said holder tube to vary the magnification of the telescopic sight.

3. Reticle mount apparatus in accordance with claim 2 in which the holder tube is pivotally mounted at one end thereof by a pivot means having a spherical surface whose center of curvature coincides with said sight point.

4. Reticle mounting apparatus in accordance with claim 1 in which the centering sleeve has a plurality of inward projections spaced substantially uniformly around the circumference of said sleeve, each projection extending substantially the entire length of said sleeve.

5. Reticle mounting apparatus in accordance with claim 1 in which reticle elements forming the sight point are attached to one end of the mounting ring and the centering sleeve engages the outer surface of the other end of said mounting ring.

6. Reticle mounting apparatus in accordance with claim 5 in which the sight point is formed by crossed reticle wires attached at their opposite ends to the mounting ring, said wires being maintained in a taut condition by the centering sleeve reducing the radial pressure applied to the mounting ring by said tube.

7. Reticle mounting apparatus in accordance with claim 1 in which the centering sleeve is made of synthetic plastic material.

8. Reticle mounting apparatus in accordance with claim 7 in which the centering sleeve has a plurality of inward projections spaced substantially uniformly around the circumference of said sleeve, said projections deforming under compression between said tube and said mounting ring.

9. Reticle mounting apparatus in accordance with claim 7 in which said centering sleeve extends radially outward of said mounting ring by an amount equal to or less than the height of said projections when said sleeve and ring are assembled in said housing tube.

10. Reticle mounting apparatus in accordance with claim 8 in which the projections are of substantially uniform height and extend across substantially the entire length of said sleeve.

11. Reticle mounting apparatus in accordance with claim 1 in which the cross-section of the centering sleeve tapers from a minimum height at one end to a maximum height at the other end of said sleeve.

12. Reticle mounting apparatus in accordance with claim 11 in which the centering sleeve is substantially equal to a taper on the outer surface of the mounting ring which is engaged by said sleeve.

13. Reticle mounting apparatus in accordance with claim 1 which also includes a thrust washer provided within said tube and spring means for resiliently urging said washer against the end of said centering sleeve to hold said centering sleeve on one end of said mounting ring.

14. Reticle mounting apparatus in accordance with claim 13 which also includes a lock ring threaded into said tube to provide a first stop means for the other end of said mounting ring, and a second stop member positioned within said support tube in contact with said spring means and in engagement with a shoulder on the interior of said tube.

15. A rifle scope, in which the improvement comprises:
- a housing tube containing erector lenses supported in axial alignment along an optical axis;
- power selection means for adjusting the longitudinal position of said erector lenses on said optical axis to vary the magnification of said scope;
- a reticle mounting ring secured within said tube;
- a reticle sight means attached to said mounting ring and providing a sight point;
- a reticle centering sleeve of synthetic plastic material provided around said mounting ring, said sleeve having a longitudinal cross-section of tapered shape which is wedged between said tube and said mounting ring to center said sight point on said optical axis.

16. A rifle scope in accordance with claim 15 in which the centering sleeve has a plurality of inward projecting ribs spaced substantially uniformly around the circumference of said sleeve, said ribs deforming under compression between said tube and said mounting ring.

17. A rifle scope in accordance with claim 15 in which the erector lenses are mounted within a lens holder tube pivotally mounted at one end thereof within said housing tube for pivoting in two mutually perpendicular directions by a socket means having a spherical pivot surface on said lens holder tube whose center of curvature coincides with said reticle sight point.

18. A rifle scope in accordance with claim 17 in which the erector lenses are moved longitudinally in said lens holder tube to change the magnification of said scope and the sight point is located in the eyepiece focal plane of said scope.

19. A rifle scope in accordance with claim 15 in which the sight point is formed by cross reticle wires attached at their opposite ends to said mounting ring.

20. A rifle scope in accordance with claim 15 which also includes a lock ring threaded into said housing tube behind said mounting ring, a stop member positioned within said housing tube in front of said mounting ring and in engagement with an inner shoulder on said housing tube; a thrust washer between said stop member and said mounting ring in position to engage one end of said centering sleeve; and an adjustment spring between said stop member and said thrust washer for maintaining the reticle sight point at a calibrated position set by adjustment of said lock ring.

* * * * *